(12) United States Patent
O'Neill (10) Patent No.: US 10,190,804 B2
(45) Date of Patent: *Jan. 29, 2019

(54) SOLAR MODULE POSITIONING SYSTEM

(71) Applicant: Andrew O'Neill, North Palm Beach, FL (US)

(72) Inventor: Andrew O'Neill, North Palm Beach, FL (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/351,038

(22) Filed: Nov. 14, 2016

(65) Prior Publication Data

US 2017/0153312 A1    Jun. 1, 2017

Related U.S. Application Data

(63) Continuation of application No. 13/969,187, filed on Aug. 16, 2013, now Pat. No. 9,494,340.

(60) Provisional application No. 61/794,005, filed on Mar. 15, 2013, provisional application No. 61/846,358, filed on Jul. 15, 2013.

(51) Int. Cl.
  *G01S 3/786* (2006.01)
  *F24S 50/20* (2018.01)
  *F24S 30/452* (2018.01)

(52) U.S. Cl.
  CPC ............ *F24S 50/20* (2018.05); *F24S 30/452* (2018.05); *G01S 3/7861* (2013.01); *Y02E 10/47* (2013.01)

(58) Field of Classification Search
  CPC ....................................................... F24J 2/38
  See application file for complete search history.

(56) References Cited

U.S. PATENT DOCUMENTS

| 4,013,885 | A | 3/1977 | Blitz |
| 4,082,947 | A | 4/1978 | Haywood et al. |
| 4,190,766 | A | 2/1980 | Young |
| 4,262,195 | A | 4/1981 | White et al. |
| 4,469,938 | A | 9/1984 | Cohen |
| 4,549,078 | A | 10/1985 | Monahan |

(Continued)

FOREIGN PATENT DOCUMENTS

| GB | 2439151 | 12/2007 |
| JP | 57010053 | 1/1982 |

(Continued)

*Primary Examiner* — Thanh Luu
(74) *Attorney, Agent, or Firm* — Akerman LLP; Michael K. Dixon (57) ABSTRACT

A solar positioning system configured to position a body, such as, but not limited to, a solar module, perpendicular to incoming solar energy to maintain an optimal angle of incidence with efficacy is disclosed. The solar positioning system may include a support subsystem having a first mechanism for controlling rotational adjustments about a first axis and a second mechanism for controlling rotational adjustments about a second axis, thereby controlling pan and tilt adjustment. Positioning of the support subsystem may be controlled by a plurality of infrared sensors similarly oriented. A differential amplifier and a comparator may be coupled between the sensor subsystem and an integrated circuit to ignore brief flashes of light. The solar positioning system may also be used with a solar positioning control system to control the position of two or more solar modules, such as hundreds of solar modules in a solar farm.

20 Claims, 10 Drawing Sheets

(56) References Cited

U.S. PATENT DOCUMENTS

| | | | |
|---|---|---|---|
| 4,719,344 A | 1/1988 | Hiroyuki | |
| 4,883,340 A | 11/1989 | Dominguez | |
| 5,632,823 A | 5/1997 | Sharan | |
| 7,207,327 B2 | 4/2007 | Litwin et al. | |
| 7,884,308 B1 * | 2/2011 | Mejia | F24J 2/38 126/576 |
| 8,119,962 B2 | 2/2012 | Lam | |
| 8,178,775 B2 | 5/2012 | Taylor et al. | |
| 8,253,086 B2 | 8/2012 | Zalusky et al. | |
| 8,324,547 B2 | 12/2012 | Chang et al. | |
| 9,494,340 B1 * | 11/2016 | O'Neill | F24J 2/38 |
| 2008/0017784 A1 | 1/2008 | Hoot et al. | |
| 2010/0006087 A1 | 1/2010 | Gilon et al. | |
| 2010/0252024 A1 | 10/2010 | Convery | |
| 2012/0048340 A1 | 3/2012 | Qadir | |
| 2012/0279485 A1 | 11/2012 | Koningstein | |

FOREIGN PATENT DOCUMENTS

| | | |
|---|---|---|
| JP | 63298011 | 12/1988 |
| WO | 2009152573 | 12/2009 |
| WO | 2012024738 | 3/2012 |
| WO | 2012136853 | 10/2012 |

\* cited by examiner

SOLAR MODULE POSITIONING SYSTEM

CROSS-REFERENCE TO RELATED APPLICATION

This application is a continuation patent application of U.S. patent application Ser. No. 13/969,187, filed Aug. 16, 2013, which claims the benefit of U.S. Provisional Patent Application No. 61/794,005 filed Mar. 15, 2013 and the benefit of U.S. Provisional Patent Application No. 61/846,358 filed Jul. 15, 2013, which are both incorporated herein in their entireties.

FIELD OF THE INVENTION

The invention relates to positioning systems, and more particularly, to solar positioning systems using an array of sensors to position a surface of a solar module for maximum effectiveness with an angle of incidence equal to, or nearly equal, to zero.

BACKGROUND

All throughout the world, there exists an ever-increasing demand for renewable, sustained, and clean energy. Moreover the demand compounds exponentially in regions where there are limited resources. The earth receives 174 petawatts (PW) of incoming solar radiation at the upper atmosphere. Approximately 30% of this solar radiation is reflected back to space while the rest is absorbed by clouds, oceans and land masses here on earth, thereby making solar energy one of the most inexhaustible, renewable resources on the planet. Harnessing and converting solar radiation is one of the most effective, pragmatic ways to address the energy demands of various energy consuming sectors worldwide. Solar technologies are broadly characterized as either passive or active depending on the way those technologies capture, convert, and distribute sunlight. Active solar techniques use photovoltaic panels, pumps, and fans to convert sunlight into useful outputs. However, the solar module has a serious hindrance in itself due to the nature of the conventional mounting system that remains in a fixed position throughout day light hours.

The angle at which a ray of sunlight hits the solar panel measured from an axis perpendicular to an outer surface of the solar panel is the angle of incidence. Electricity generation is maximized when the angle of incidence is zero, such as when the solar panel directly faces the sun. As the angle of incidence increases, the system experiences geometric energy loss in relation to the angle rendering fixed mount apparatuses for solar modules uneconomical. Thus, a need exists for a more efficient, robust solar energy harnessing system.

SUMMARY OF THE INVENTION

A solar positioning system configured to position a body, such as, but not limited to, a solar module, perpendicular to incoming solar energy to maintain an optimal angle of incidence with efficacy is disclosed. The solar positioning system may include one or more support subsystems having a first mechanism for controlling rotational adjustments about a first axis and a second mechanism for controlling rotational adjustments about a second axis, thereby controlling pan and tilt in at least one embodiment. Positioning of the support subsystem may be controlled by a plurality of pyroelectric infrared sensors similarly oriented. A differential amplifier and a comparator may be coupled between the sensor subsystem and an integrated circuit to ignore secondary light sources, such as brief flashes of light, thereby making the solar positioning system usable in urban settings. The solar positioning system may also be used with a solar positioning control system to control the position of two or more solar modules, such as a solar farm.

The solar positioning system may include a support subsystem having a first mechanism for controlling rotational adjustments about a first axis and a second mechanism for controlling rotational adjustments about a second axis. In at least one embodiment, the first mechanism of the support subsystem may be configured to control tilt adjustment and may be formed from a yoke. The second mechanism of the support subsystem may be configured to control pan adjustment and may be formed from a rotatable base that rotates about the second axis that is orthogonal to the first axis. The yoke may be formed from first and second arms extending radially upward from a common axis point. The second mechanism of the support subsystem may be configured to control pan and may be formed from a rotatable base that rotates about the second axis at the common axis point, whereby the second axis is orthogonal to the first axis.

The solar positioning system may include a sensor subsystem formed from a plurality of pyroelectric infrared sensors similarly oriented. In at least one embodiment, the sensor subsystem may include three or more pairs of pyroelectric infrared sensors. In yet another embodiment, the sensor subsystem may include four or more pairs of pyroelectric infrared sensors. The solar positioning system may include a solar module positioned on the support subsystem and aligned with the sensor subsystem such that the sensor subsystem is configured to orient the solar module to be orthogonal to solar energy. The pyroelectric infrared sensors may be coupled to the solar module, coupled to a frame or the like.

The solar positioning system may include a first motor for driving the first mechanism in first and second directions, such as forward and reverse, that are opposite to each other and a second motor for driving the second mechanism in first and second directions, such as forward and reverse, that are opposite to each other. In at least one embodiment, the first motor may be a stepper motor or the second motor may be a stepper motor, or both.

The solar positioning system may include a number of components to convert the solar energy striking the pyroelectric infrared sensors into a signal received by one or both of the first and second motors to control movement, and thus, the angle of incidence of the solar module. For instance, the solar positioning system may include one or more Fresnel lenses positioned between one or more of the pyroelectric infrared sensors and the solar energy source producing the solar energy to focus the solar energy onto the sensor. The solar positioning system may also include a differential amplifier coupled to the sensor subsystem and positioned between the sensor subsystem and an integrated circuit. The pyroelectric infrared sensors of the sensor subsystem may be configured in pairs as opposite inputs to the differential amplifier such that measurements from the pyroelectric infrared sensors cancel each other out so that an average temperature of a field of view of each sensor is removed from signals received from the pyroelectric infrared sensors. A comparator may be coupled to the amplifier between the amplifier and the integrated circuit. The integrated circuit may be coupled to a pulse width modulator to process data received from the sensor subsystem through the differential amplifier and the comparator and to generate at least one signal that is sent to at least one of the first and second motors. In at least one embodiment, the integrated circuit is a field programmable gate array. Before the signal reaches the first or second motors, the signal is passed to an indexer capable of generating step pulses and direction signals and a driver that converts signals from the indexer into power useful for energizing the first or second motors, or both.

The solar positioning system may include one or more portable power storage devices configured to provide power to at least the first and second motors. In at least one embodiment, the portable power storage device may be, but is not limited to being, a battery. The battery may be, but is not limited to, a 12 volt deep cycle battery adapted for extended usage. The solar positioning system may include one or more shunt regulators that dissipates excess current to prevent overcharging the battery.

In another embodiment, a solar positioning control system for controlling the orientation of two or more solar modules, and in at least one embodiment, for controlling the orientation of a multitude of solar modules in a solar farm is disclosed. The solar positioning control system may include a central control system in communication with a sensor subsystem comprised of a plurality of pyroelectric infrared sensors similarly oriented, such as, but not limited to three or more pairs of pyroelectric infrared sensors. The solar positioning control system may include a sensor subsystem formed from of a plurality of pyroelectric infrared sensors similarly oriented and in communication with the central control system. The central control system may be in communication with a plurality of solar positioning systems via wired or wireless communications. The solar positioning systems may be formed from the components previously described including a support subsystem, a solar module, a first motor and a second motor for controlling orientation of the solar module. Thus, in at least one embodiment, a single sensor subsystem may control the position of hundreds of solar modules.

An advantage of the solar positioning system is that the system positions one or more solar modules at an optimum angle of incidence with the sun's rays at any location in the world.

Another advantage of the solar positioning system is that the system increases the efficiency of solar energy capture devices, thereby offering a clean, climate-friendly, abundant and inexhaustible energy resource usable throughout sun-filled regions of the world, which coincidentally, are those regions predicted to experience the largest population growth over the next decades.

Yet another advantage of the support subsystem is that the stepper motors are low cost, highly reliable, generate high torque at low speeds and possess a simple, rugged construction that operates in almost any environment.

Another advantage of the support subsystem is that the Fresnel lens reduces the amount of material needed and provides a closer focal point than conventional systems.

Still another advantage of the support subsystem is that the energy yield of a colar module used with the support subsystem is estimated to achieve a theoretical maximum yield of up to 12 times the yield of conventional systems commercially operational today, depending on the time of year and geography.

These and other embodiments are described in more detail below.

BRIEF DESCRIPTION OF THE FIGURES

The accompanying drawings, which are incorporated in and form a part of the specification, illustrate embodiments of the presently disclosed invention and, together with the description, disclose the principles of the invention.

DETAILED DESCRIPTION OF THE FIGURES

As shown in FIGS. 1-13, a solar positioning system 10 configured to position a body 12, such as, but not limited to, a solar module 14, perpendicular to incoming solar energy 16 to maintain an optimal angle of incidence 18 with efficacy is disclosed. The solar positioning system 10 may include a support subsystem 20 having a first mechanism 22 for controlling rotational adjustments about a first axis 24 and a second mechanism 26 for controlling rotational adjustments about a second axis 28, thereby controlling pan and tilt adjustments in at least one embodiment. Positioning the support subsystem 20 may be controlled by a plurality of pyroelectric infrared sensors 30 similarly oriented. In at least one embodiment, the support subsystem 20 may be controlled by at least three pairs of pyroelectric infrared sensors 30 similarly oriented. In yet another embodiment, the support subsystem 20 may be controlled by at least four pairs of pyroelectric infrared sensors 30 similarly oriented. A differential amplifier 32 and a comparator 34 may be coupled between the sensor subsystem 20 and an integrated circuit 36 to ignore brief flashes of light, thereby making the solar positioning system usable in urban settings. The solar positioning system 10 may also be used with a solar positioning control system 38 to control the position of two or more solar modules 14, such as a solar farm 40.

Figure 1:
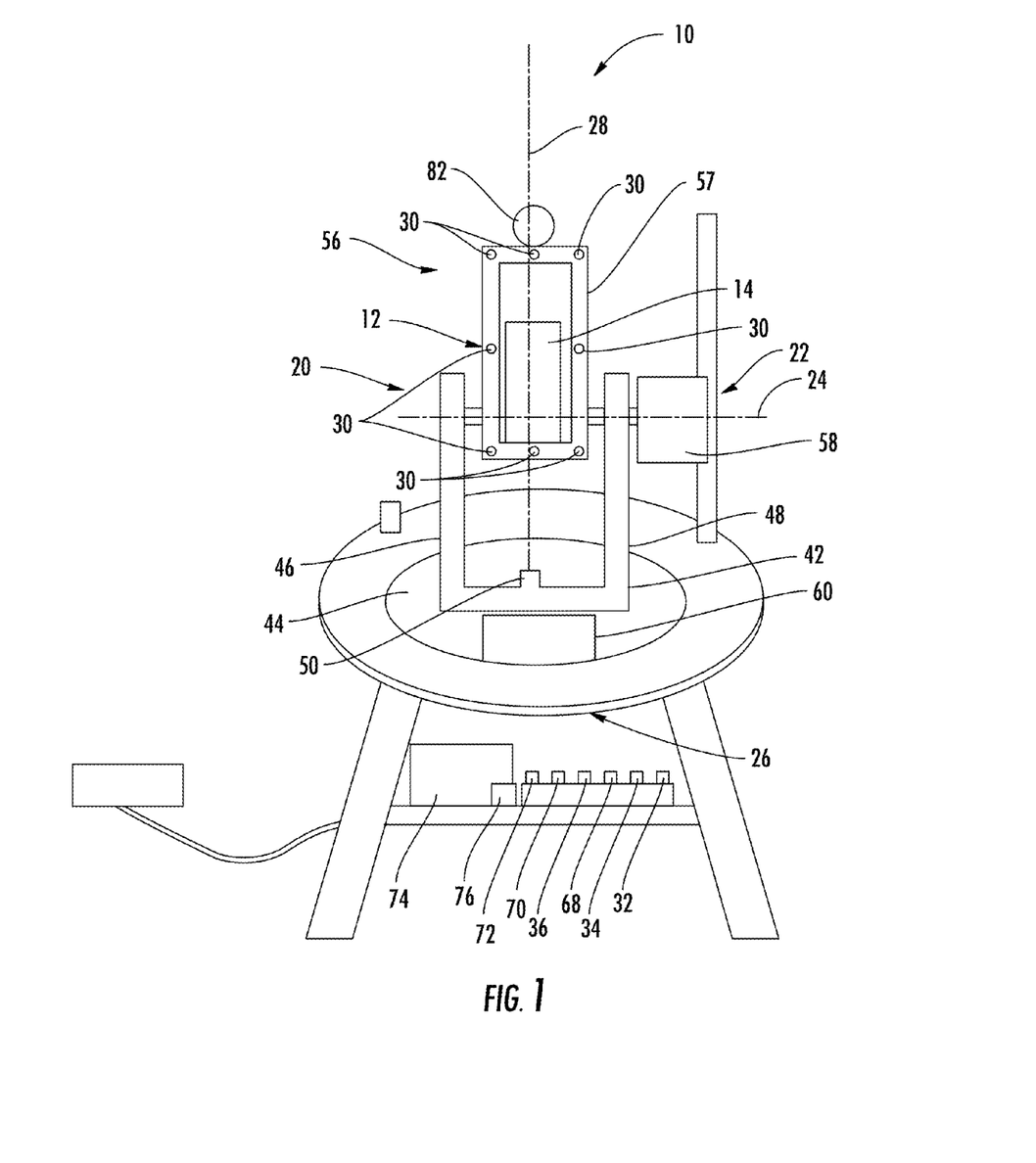
FIG. 1 is a perspective view of the solar positioning system.
Figure 2:
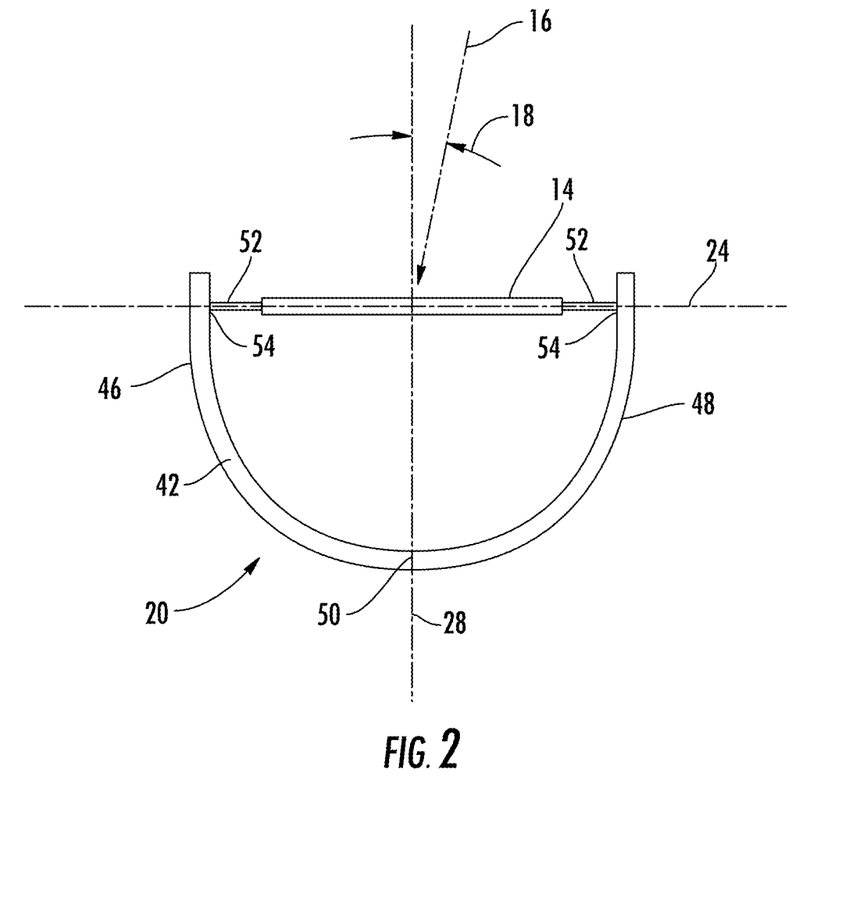
FIG. 2 is a side view of the support subsystem with a solar module.

The solar positioning system 10 may include a support subsystem 20 having a first mechanism 22 for controlling rotational adjustments about a first axis 24, which may be a tilt control. The support subsystem 20 may also include a second mechanism 26 for controlling rotational adjustments about a second axis 28, which may be a pan control. In at least one embodiment, the first mechanism 22 of the support subsystem 20 may be configured to control tilt and may be formed from a yoke 42. The second mechanism 26 of the support subsystem 20 may be configured to control pan and may be formed from a rotatable base 44 that rotates about the second axis 28 that is orthogonal to the first axis 24. The yoke 42 may be formed from first and second arms 46, 48 that are curved outwardly and extending radially upward from a common axis point 50.

One or more solar modules 14 may be supported by the solar positioning system 10. In at least one embodiment, a solar module 14 may be supported by the first and second arms 46, 48. In particular, the solar module 14 may be rotatably coupled to the first arm 46 via a pin 52 and hole 54 connection or other appropriate connection. The solar module 14 may similarly be rotatably coupled to the second arm 48 via a pin 52 and hole 54 connection or other appropriate connection. As such, the solar module may be rotated relative to the first axis 24 defined by the first and second arms 46, 48. The solar module 14 may be any component capable of converting solar energy into electric current, such as, but not limited to one or more photovoltaic cells.

The solar positioning system 10 may include a sensor subsystem 56 comprised of a plurality of pyroelectric infrared sensors 30 similarly oriented. The pyroelectric infrared sensors 30 may be positioned on the support subsystem 20 and may be aligned with the solar module 14 such that the sensor subsystem 10 is configured to orient the solar module 14 to be orthogonal to solar energy 16. The pyroelectric infrared sensors 30 may be positioned on a frame 57 that enables all of the pyroelectric infrared sensors 30 to be similarly positioned. Alternatively, the pyroelectric infrared sensors 30 may be positioned on the solar module 14 that enables all of the pyroelectric infrared sensors 30 to be similarly positioned. The pyroelectric infrared sensors 30 may have extremely fast response and may include an internal field effect transistor (FET) to detect surface charge changes. One or more light emitting devices (LEDs) 82 may be positioned near the sensor subsystem 56. The LED may be used as a component of a fail safe system used to recalibrate the system 10 by resetting the duty cycle. The LED also can be used to indicate that the system 10 is operating correctly.

The solar positioning system 10 may include a first motor 58 for driving the first mechanism 22 in first and second directions that are opposite to each other. In at least one embodiment, such controlled movement of the first mechanism 22 controls tilt of the solar module 14. The solar positioning system 10 may also include a second motor 60 for driving the second mechanism 26 in first and second directions that are opposite to each other. In at least one embodiment, such controlled movement of the second mechanism 26 controls pan of the solar module 14. In at least one embodiment, the first motor 58 may be a stepper motor, and the second motor 60 may be a stepper motor. The first and second motors 58, 60 may be controlled via a simple H-bridge circuit. The first and second motors 58, 60 may also be bipolar without center taps.

Figure 3:
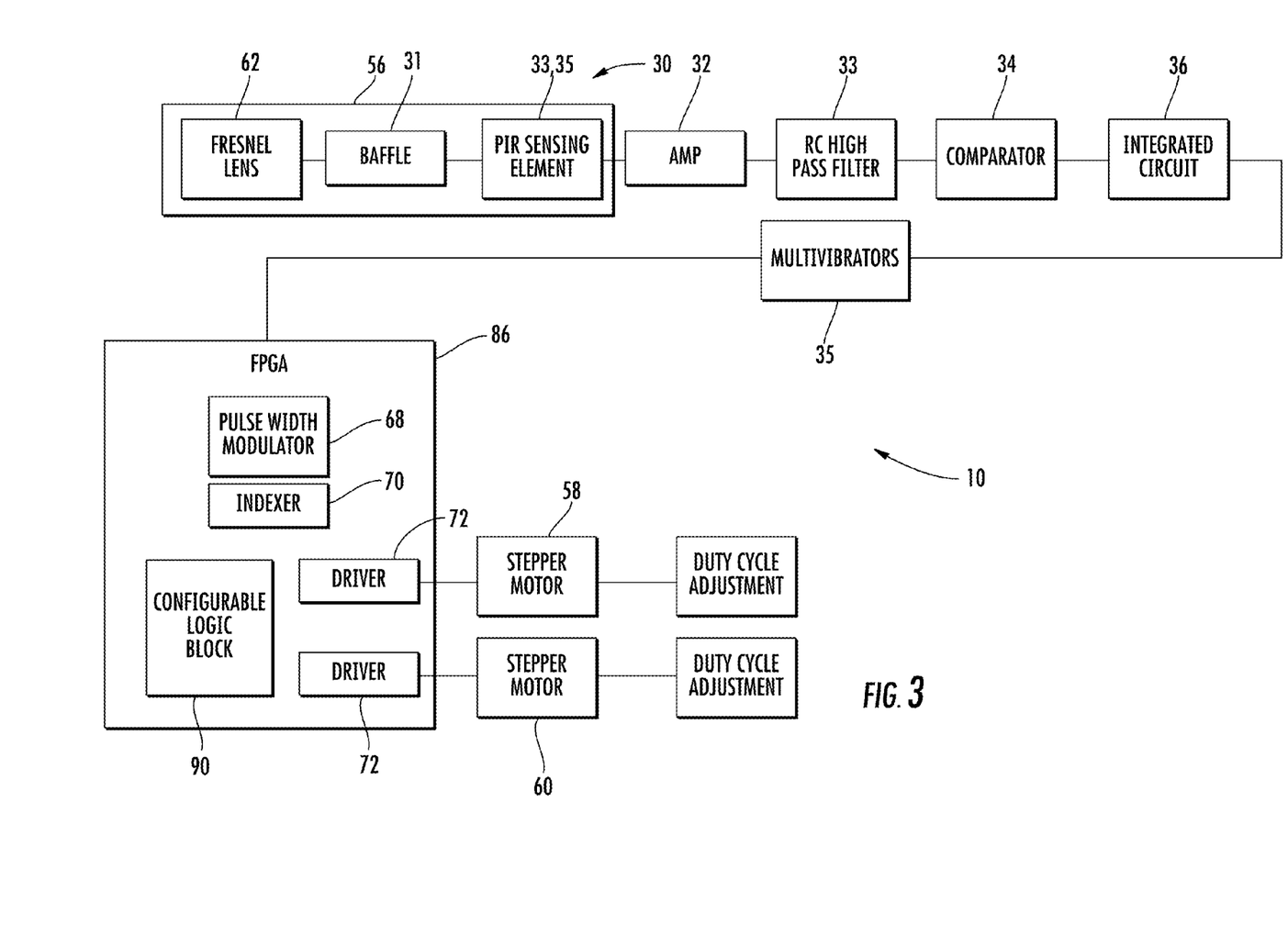
FIG. 3 is a schematic diagram of the solar positioning system.
Figure 7:
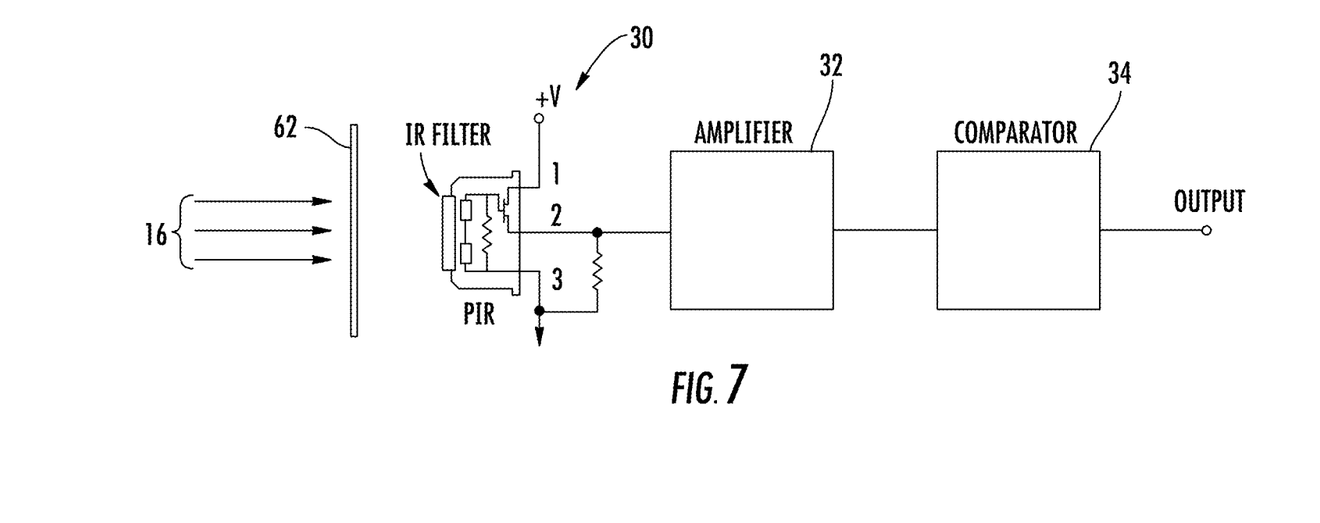
FIG. 7 is a schematic diagram of a pyroelectric infrared sensor with supporting components.
Figure 8:
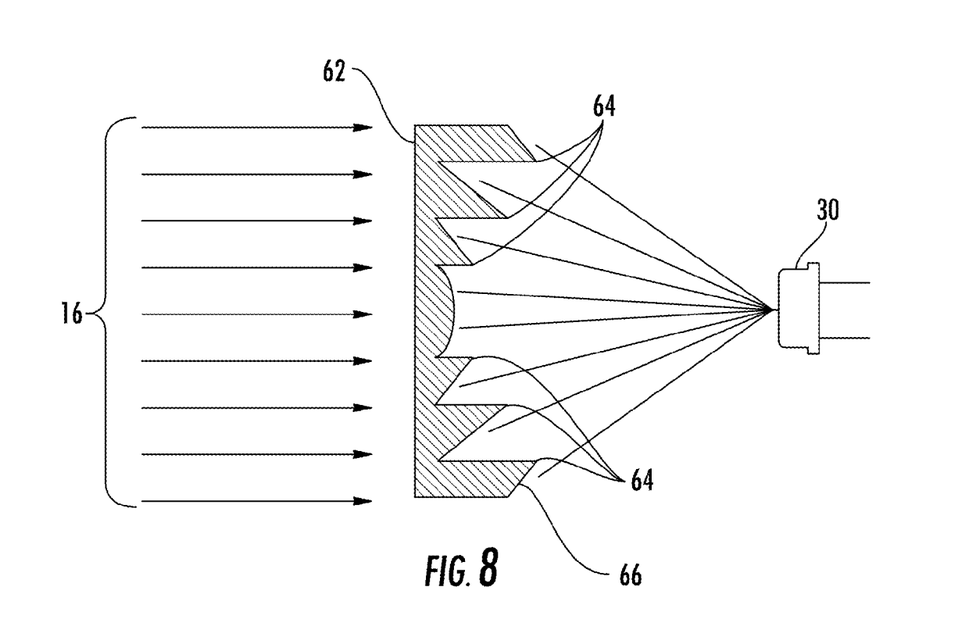
FIG. 8 is cross-sectional side view of a Fresnel lens.
Figure 9:
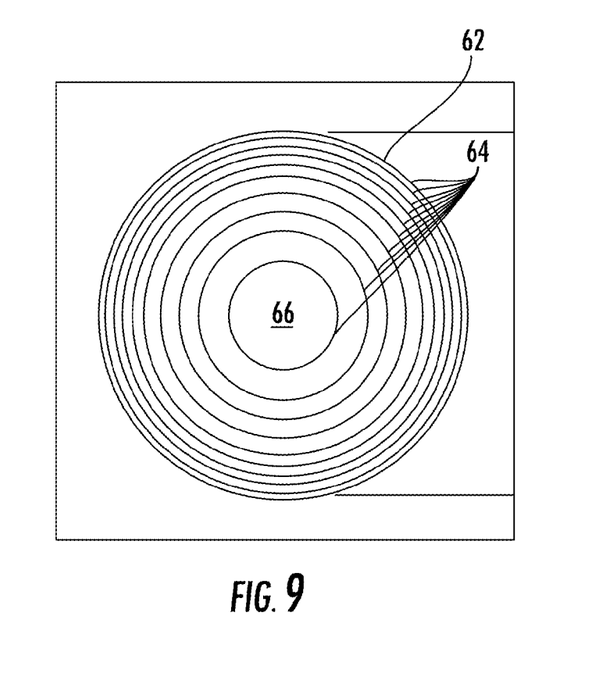
FIG. 9 is a front view of the Fresnel lens.

The solar positioning system 10 may include a number of components to manipulate the solar energy striking the pyroelectric infrared sensors 30 into a signal received by one or both of the first and second motors 58, 60 to control movement, and thus, the angle of incidence 18 of the solar module 14. For instance, the solar positioning system 10 may include one or more Fresnel lenses 62 positioned between one or more of the pyroelectric infrared sensors 30 and the solar energy source producing the solar energy 16, as shown in FIG. 3. The Fresnel lens 62 may include a plurality of circular ridges 64 on a first side 66, as shown in FIGS. 7-9. The circular ridges 64 on a first side 66 may face the pyroelectric infrared sensor 30. The Fresnel lens 62 may have an optimum transmittance between about 8 um and 14 um. The Fresnel lens 62 may have a focal point of between about 0.4 inch and about 0.8 inch, and in at least one embodiment, may have a focal length of about 0.65 inch.

Figure 6:
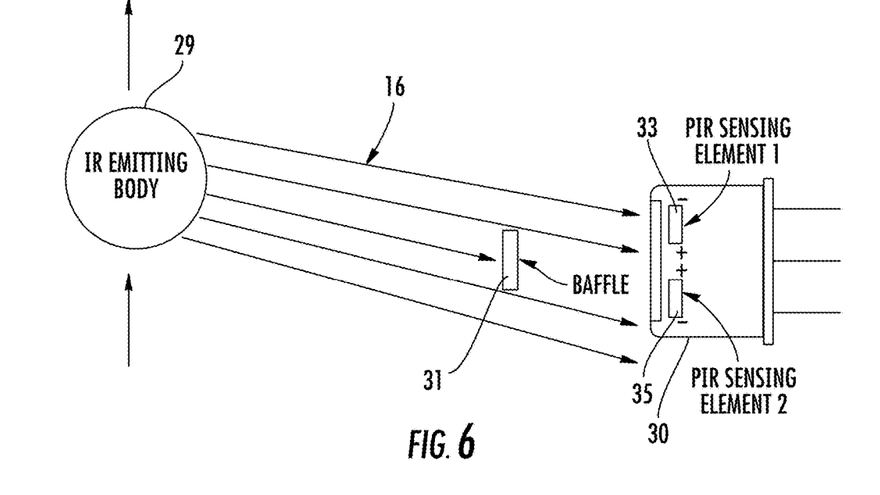
FIG. 6 is an alternative schematic view light striking pyroelectric infrared sensors at a different angle.

The solar positioning system 10 may also include one or more baffles 31, as shown in FIGS. 3 and 6. The baffle 31 may be positioned proximate to a sensor 30 formed from two sensing elements including a first sensing element 33 and a second sensing element 35. In particular, the baffle 31 may be positioned between the first and second sensing elements 33, 35 and an infrared emitting body 29. The baffle 31 may be centered between the first sensing element 33 and second sensing element 35 such that the baffle 31 obstructs radiation directed toward the sensors 30, as shown in FIG. 6. In at least one embodiment, the first and second sensing elements 33, 35 may each have a width of about 0.039 inches in width. The first and second sensing elements 33, 35 should be closely spaced such that when the sun is at an angle other than orthogonal to the first and second sensing elements 33, 35, the baffle 31 blocks a portion of the light striking one of the first and second sensing elements 33, 35, thereby enabling different signals to be generated to determine how the sensors 30 are misaligned relative to the sun.

As shown in FIGS. 1, 3, 4 and 7, a differential amplifier 32 may be coupled to the sensor subsystem 56 and may be positioned between the sensor subsystem 56 and an integrated circuit 36. The pyroelectric infrared sensors 30 of the sensor subsystem 56 may be configured as opposite inputs to the differential amplifier 32 such that measurements from the pyroelectric infrared sensors 30 cancel each other out so that an average temperature of a field of view of each sensor 30 is removed from signals received from the pyroelectric infrared sensors 30. The amplifier 32 may increase the power of signal by taking energy from a power supply and controlling the output to match the input signal shape but with a larger amplitude.

Figure 4:
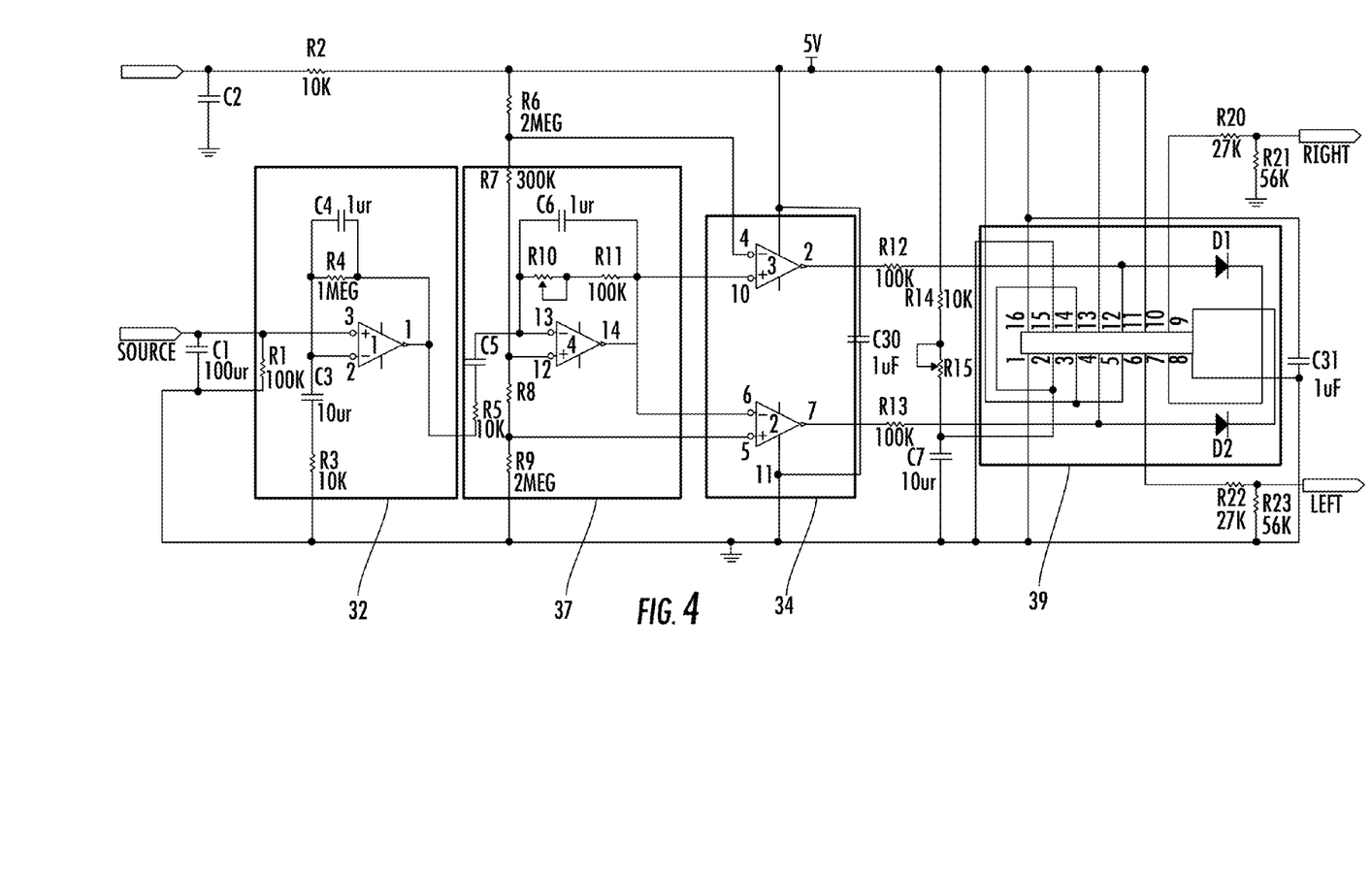
FIG. 4 is a schematic diagram of a differential amplifier, RC high pass filter, comparator and multivibrator of the solar positioning system.
Figure 5:
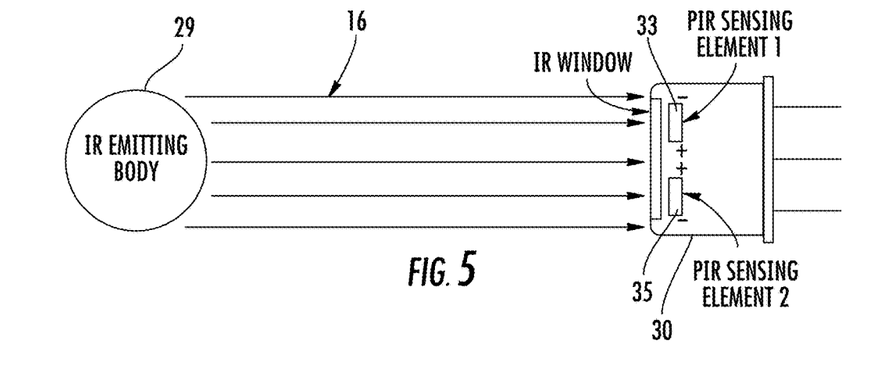
FIG. 5 is a schematic view of light striking pyroelectric infrared sensors.

The solar positioning system 10 may also include a comparator 34 coupled to the amplifier 32 between the amplifier 32 and the integrated circuit 36. The comparator 34 may compare two voltages or currents and switches its output to indicate which is larger. The comparator 34 may provide a small voltage window for PIR signal to avoid noise of minor sensor fluctuations. An RC high pass filter 37 may be positioned between the differential amplifier 32 and the comparator 34. Downstream from the comparator 34 may be multivibrators 39 used to latch output signals, and may in at least one embodiment, be a dual monostable re-triggerable Multivibrator integrated circuit 36. The multivibrator 39 may be an electric circuit used to implement a variety of simple two-state systems. Dual monostable multivibrator 39 may be re-triggerable and re-settable for continuous motion detection.

The integrated circuit 36 may be coupled to a pulse width modulator 68 to process data received from the sensor subsystem 56 through the differential amplifier 32 and the comparator 34 and to generate at least one signal that is sent to at least one of the first and second motors 58, 60. Before the signal reaches the first or second motors 58, 60, the signal is passed to an indexer 70 capable of generating step pulses and direction signals and a driver 72 that converts signals from the indexer 70 into power useful for energizing the first or second motors 58, 60, or both.

The solar positioning system 10 may include one or more portable power storage devices 74 configured to provide power to at least the first and second motors 58, 60 and to store electricity from the solar module 14. In at least one embodiment, the portable power storage device 74 may be, but is not limited to being, a battery. The battery 74 may be, but is not limited to, a 12 volt deep cycle battery adapted for extended usage. The solar positioning system 10 may include one or more shunt regulators 76 to prevent overcharging the battery 74. The shunt regulator 76 may dissipate excess current. The output voltage may be set to a constant charging voltage. The solar positioning system 10 may sense the output current. The integrated circuit 36 may increase the duty cycle, thus changing the operating point. If a new operating point has greater output power, then the system may increase the duty cycle. The indexer 70 together with the driver 72 adjust the duty cycles in communication with the first and second motors 58, 60.

Figure 10:
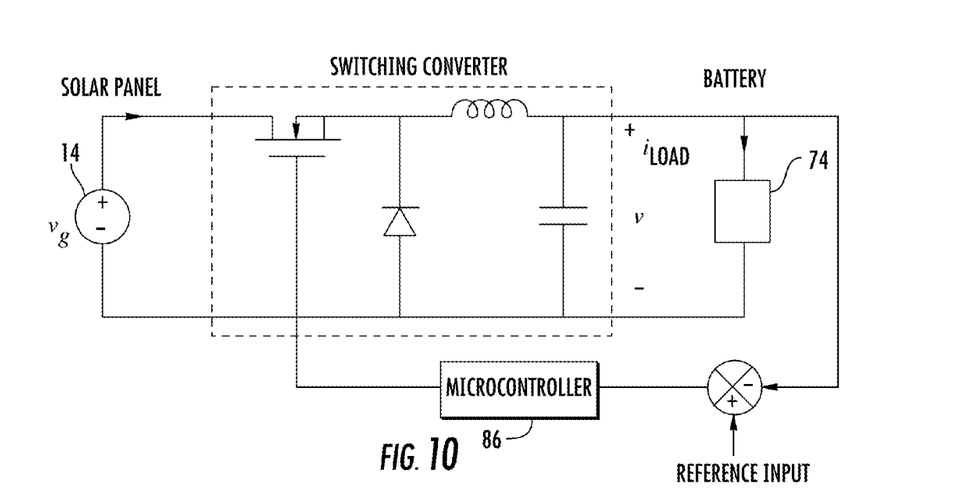
FIG. 10 is a schematic diagram of the solar module charging circuit.
Figure 11:
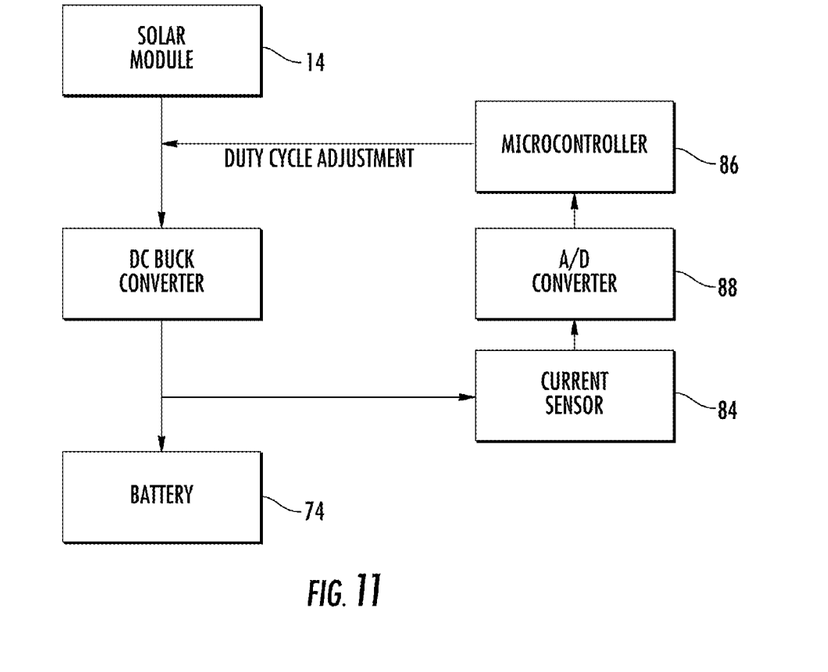
FIG. 11 is a detailed schematic diagram of the solar module charging circuit.

As shown in FIGS. 10 and 11, the solar module 14 may be in communication with the portable power storage device 74 via a direct current (DC) buck converter. One or more current sensors 84 may also be in communication with the input to the portable power storage device 74. The current sensor 84 may be in communication with a microcontroller 86 via an analog to digital (A/D) converter 88. The microcontroller 86 may be, but is not limited to being, a field-programmable gate array (FPGA). The FPGA 86 may include a configurable logic block 90.

Figure 13:
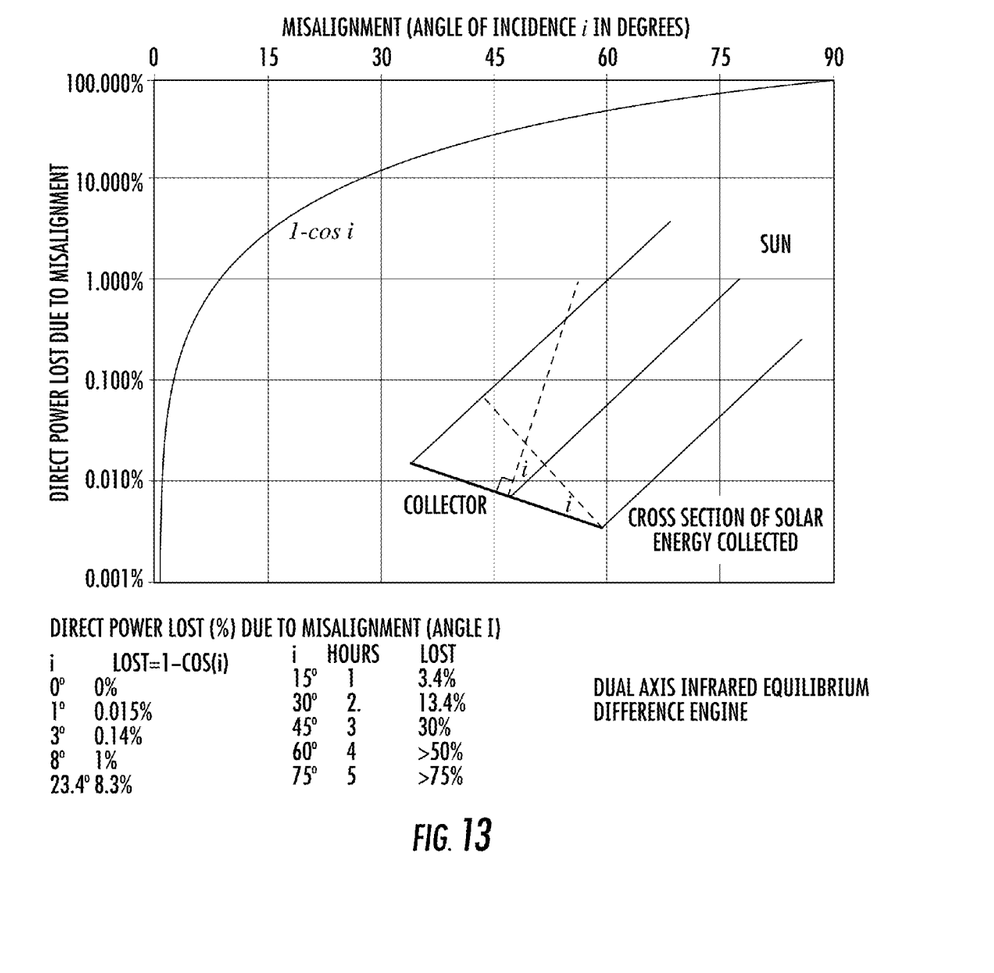
FIG. 13 is a graph of power loss relative to misalignment relative to an axis orthogonal to a collector surface.

During use, the solar positioning system 10 may be positioned in any locale where the pyroelectric infrared sensors 30 are exposed to sunlight. In particular, the solar positioning system 10 may be positioned in urban or rural settings. The solar positioning system 10 may be configured to ignore brief flashes of light that are often found in urban settings with a high degree of regularity. Because the solar positioning system 10 includes one or more portable power storage devices 74, the solar positioning system 10 is not limited to use only where a publicly available power grid exists. The solar positioning system 10 may operate to position the body 12, such as one or more solar modules 14 orthogonal such that the system may be as efficient as possible, as shown in FIG. 13.

Once positioned, the solar positioning system 10 may expose the pyroelectric infrared sensors 30 to solar energy 16, such as sunlight. Sunlight first passes through the Fresnel lens 62 where the sunlight is focused directly into a pyroelectric infrared sensor 30. The pyroelectric sensor 30 generates a signal that is passed to the differential amplifier 32 and then to the comparator 34. The pyroelectric sensors 30 generate electric current proportional to the rate of change in temperature. The pyroelectric sensor 30 provides sensitivity and accuracy necessary for precise measurements. Pairs of pyroelectric sensors 30 may be wired as opposite inputs to a differential amplifier 32. In at least one embodiment, the solar positioning system 10 may include at least three pairs of pyroelectric sensors 30. In another embodiment, the solar positioning system 10 may include at least four pairs of pyroelectric sensors 30. In such a configuration, measurements from pyroelectric sensors 30 cancel each other out so that the average temperature of the field of view is removed from the electrical signal produced by the pyroelectric sensors 30. Thus, an increase of infrared energy across the entire sensor is canceled and will not trigger the first or second motors 58, 60. Such a configuration allows the solar positioning system 10 to resist false indications of change in the event of being exposed to brief flashes of light or field-wide illumination as continuous high-energy exposure may still be able to saturate the sensors 30 and render the sensors 30 unable to register further information.

In order for the data created by the array of pyroelectric sensors 30 to be converted into processable input for the pan/tilt support subsystem 20, the signals created by the sensors 30 may be processed and then passed to an integrated circuit 36. The integrated circuit 36 may be designed to be configured by a customer or designer after manufacturing and may contain logic blocks and a hierarchy of reconfigurable interconnects that allow the blocks to be wired together. The integrated circuit 36 may include an imbedded soft core and may be used in conjunction with a pulse-width modulator 68 to process infrared data and expel an output signal that can be interpreted by the first and second motors 58, 60. Before the signals are passed to the integrated circuit 36, the signals may be processed in the differential amplifier 32 and the comparator 34. Signals are then passed to the indexer 70, which may be a microprocessor capable of generating the necessary step pulses and direction signals for the driver 72. The driver 72 may convert the command signals from the indexer 70 into the power necessary to energize the windings.

Once the signals are received by the first and second motors 58, 60, the motors 58, 60 move various components within the support subsystem 20. In at least one embodiment in which a solar module 14 is couple to a yoke 42, the solar module 14 is rotated about the first axis 24 extending between the first and second arms 46, 48 to control the tilt of the solar module 14. The solar module 14 may also be rotated about the second axis 28 extending vertically through the common axis point 50 of the yoke 42 to control the pan of the solar module 14. Such a support subsystem 20 enables the outer surface of the solar module 14 to be kept orthogonal to the solar energy 16 throughout the day, from sunrise to sunset. The support subsystem 20 constantly adjusts the position of the solar module 14 via the first and second motors 58, 60 throughout the day.

Figure 12:
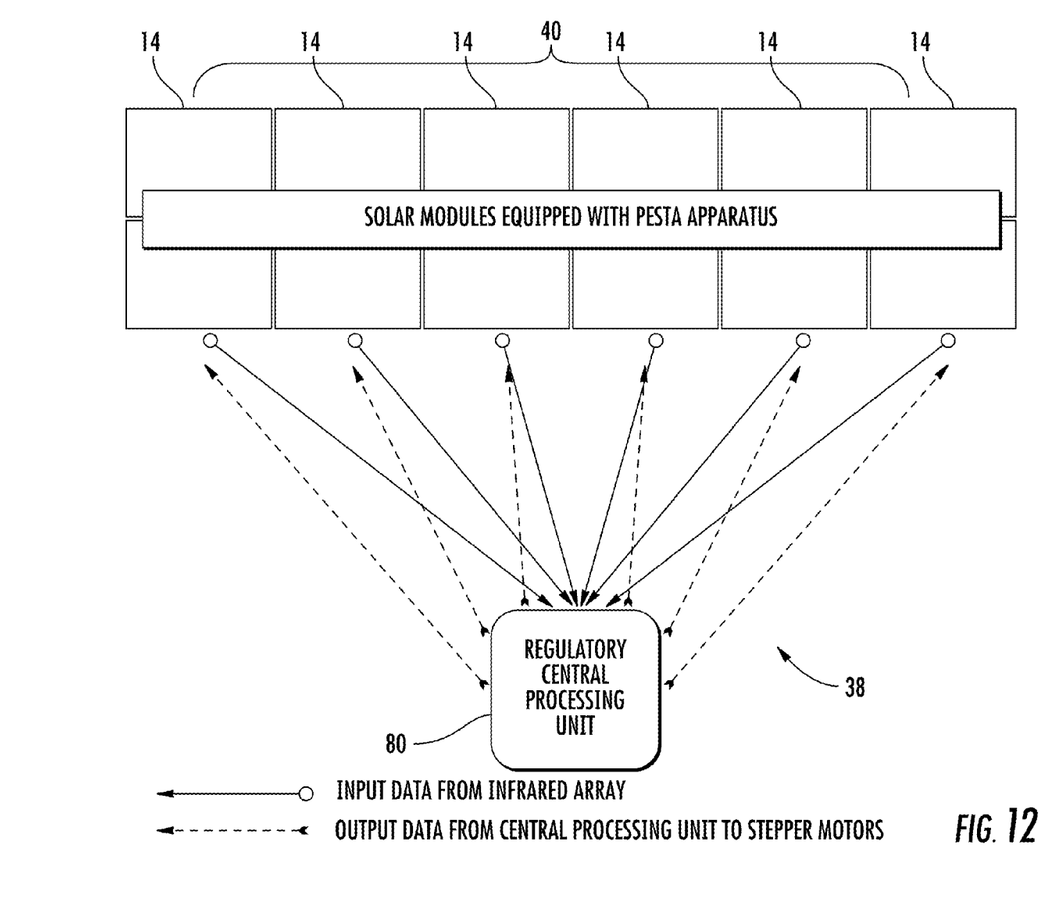
FIG. 12 is a system in which a solar positioning system is used to control the position of multiple bodies, such as, but not limited to, solar modules.

In another embodiment, a solar positioning control system 38 for controlling the orientation of two or more solar modules 14, and in at least one embodiment, for controlling the orientation of hundreds solar modules 14 in a solar farm 40 is disclosed. The solar positioning control system 38 may include a central control system 80 in communication with a sensor subsystem 56 comprised of a plurality of pyroelectric infrared sensors 30 similarly oriented. The solar positioning control system 38 may include a sensor subsystem 56 formed from of a plurality of pyroelectric infrared sensors 30 similarly oriented and in communication with the central control system 80. The central control system 80 may be in communication with a plurality of solar positioning systems 10 via wired or wireless communications. The solar positioning systems 10 may be formed from the components previously described including a support subsystem 20, a solar module 14, a first motor 58 and a second motor 60 for controlling orientation of the solar module 14. The central control system 80 may receive data signals from the sensor subsystem 56 and may process those signals using the components described above. The output may then be shared with two or more support subsystems 20 to position two or more solar modules 14 in the same orientation with generally zero degree of incidence relative to the solar energy 16.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A positioning system, comprising:
   a support subsystem having a first mechanism for controlling rotational adjustments about a first axis and a second mechanism for controlling rotational adjustments about a second axis;
   a sensor subsystem comprised of at least three pairs of infrared sensors similarly oriented;

a drive mechanism for driving the first mechanism in first and second directions that are opposite to each other;

wherein the drive mechanism is configured to drive the second mechanism in first and second directions that are opposite to each other;

a comparator coupled to the sensor subsystem and an integrated circuit; and the integrated circuit coupled to a pulse width modulator to process data received from the sensor subsystem through the comparator and to generate at least one signal that is sent to at least one of the first and second mechanisms.

2. The positioning system of claim 1, further comprising a focusing element positioned between at least one of the infrared sensors and a solar energy source.

3. The positioning system of claim 1, further comprising an indexer capable of generating processable signals and a driver that converts signals from the indexer into power useful for energizing the drive mechanism.

4. The positioning system of claim 1, wherein the integrated circuit is an array of programmable logic blocks and a hierarchy of reconfigurable interconnects that allow the programmable logic blocks to communicate in different configurations, perform complex combinational functions and simple logic gates.

5. The positioning system of claim 1, further comprising a solar module positioned on the support subsystem and aligned with the sensor subsystem such that the sensor subsystem is configured to orient the solar module to be orthogonal to solar energy.

6. The positioning system of claim 1, wherein the first mechanism of the support subsystem is configured to control tilt and is formed from a yoke and wherein the second mechanism of the support subsystem is configured to control pan and is formed from a rotatable base that rotates about the second axis that is orthogonal to the first axis.

7. The positioning system of claim 1, further comprising at least one portable power storage device configured to provide power to the drive mechanism.

8. The positioning system of claim 1, further comprising a baffle positioned between the first sensing element and second sensing element of one of the at least three pairs of infrared sensors and an infrared emitting body.

9. The positioning system of claim 1, wherein the drive mechanism is a stepper motor.

10. The positioning system of claim 1, further comprising a shunt regulator to prevent overcharging a battery.

11. A positioning system, comprising:
a support subsystem having a first mechanism for controlling rotational adjustments about a first axis and a second mechanism for controlling rotational adjustments about a second axis;
wherein the first mechanism of the support subsystem is configured to control tilt and is formed from a yoke formed from first and second arms extending radially upward from a common axis point and wherein the second mechanism of the support subsystem is configured to control pan and is formed from a rotatable base that rotates about the second axis at the common axis point, wherein the second axis is orthogonal to the first axis;
a sensor subsystem comprised of at least three pairs of infrared sensors similarly oriented, each with a focusing element positioned between the infrared sensor and a solar energy source, wherein a baffle is positioned between the first sensing element and second sensing element of one of the at least three pairs of infrared sensors and an infrared emitting body;
a drive mechanism for driving the first mechanism in first and second directions that are opposite to each other and wherein the drive mechanism is configured to drive the second mechanism in first and second directions that are opposite to each other;
a differential amplifier coupled to the sensor subsystem and positioned between the sensor subsystem and an integrated circuit, wherein the infrared sensors of the sensor subsystem are configured as opposite inputs to the differential amplifier such that measurements from the infrared sensors cancel each other out so that an average temperature of a field of view of each sensor is removed from signals received from the infrared sensors;
a comparator coupled to the amplifier between the amplifier and the integrated circuit;
the integrated circuit is coupled to a pulse width modulator to process data received from the sensor subsystem through the differential amplifier and the comparator and to generate at least one signal that is sent to the drive mechanism;
an indexer capable of generating processable signals; and
a driver that converts signals from the indexer into power useful for energizing the drive mechanism.

12. The positioning system of claim 11, wherein the integrated circuit is an array of programmable logic blocks and a hierarchy of reconfigurable interconnects that allow the programmable logic blocks to communicate in different configurations, perform complex combinational functions and simple logic gates.

13. The positioning system of claim 11, further comprising a solar module positioned on the support subsystem and aligned with the sensor subsystem such that the sensor subsystem is configured to orient the solar module to be orthogonal to the solar energy source.

14. The positioning system of claim 11, further comprising at least one portable power storage device configured to provide power to the drive mechanism.

15. The positioning system of claim 14, wherein the at least one portable power storage device is a battery.

16. The positioning system of claim 11, further comprising a shunt regulator to prevent overcharging a battery.

17. A positioning control system, comprising:
a central control system in communication with a sensor subsystem comprised of a plurality of infrared sensors similarly oriented;
the sensor subsystem comprised of at least three pairs of infrared sensors similarly oriented and in communication with the central control system, wherein a baffle is positioned between the first sensing element and second sensing element of one of the at least three pairs of infrared sensors and an infrared emitting body;
a comparator coupled to the sensor subsystem and the integrated circuit; and
the integrated circuit coupled to a pulse width modulator to process data received from the sensor subsystem through a differential amplifier and the comparator and to generate at least one signal that is sent to at least one of the first and second stepper motors;
a plurality of positioning systems, each comprising:
a support subsystem having a first mechanism for controlling rotational adjustments about a first axis and a second mechanism for controlling rotational adjustments about a second axis;

a solar module positioned on the support subsystem and aligned with the sensor subsystem such that the sensor subsystem is configured to orient the solar module to be orthogonal to solar energy;

a drive mechanism for driving the first mechanism in first and second directions that are opposite to each other; and the drive mechanism for driving the second mechanism in first and second directions that are opposite to each other.

18. The positioning control system of claim 17, wherein the first mechanism of the support subsystem is configured to control tilt and is formed from a yoke formed from first and second arms extending radially upward from a common axis point and wherein the second mechanism of the support subsystem is configured to control pan and is formed from a rotatable base that rotates about the second axis at the common axis point, wherein the second axis is orthogonal to the first axis.

19. The positioning control system of claim 17, wherein the drive mechanism is a stepper motor.

20. The positioning control system of claim 17, further comprising an indexer capable of generating processable signals, a driver that converts signals from the indexer into power useful for energizing the drive mechanism, and at least one portable power storage device configured to provide power to the drive mechanism.

* * * * *